United States Patent [19]

Dong et al.

[11] Patent Number: 5,595,594
[45] Date of Patent: Jan. 21, 1997

[54] ANTI-EFFLORESCENCE ADMIXTURE FOR CONCRETE PRODUCTS

[75] Inventors: Jie-Yi Dong, Oakville, Canada; David F. Factor, Hiram, Ohio; Hamid Farzammehr, Chagrin Falls, Ohio; Kenneth Sroka, Parma, Ohio

[73] Assignee: Sandoz Ltd, Basle, Switzerland

[21] Appl. No.: 471,433

[22] Filed: Jun. 6, 1995

Related U.S. Application Data

[62] Division of Ser. No. 330,276, Oct. 27, 1994, abandoned.

[51] Int. Cl.$^6$ .................................................. C04B 24/08
[52] U.S. Cl. ..................... 106/661; 106/665; 106/802; 106/810; 106/822; 106/823; 106/243; 524/270; 524/322; 524/650
[58] Field of Search ...................... 106/665, 661, 106/819, 696, 724, 802, 810, 822, 823, 243; 524/5, 270, 322, 650

[56] References Cited

U.S. PATENT DOCUMENTS

| | | | |
|---|---|---|---|
| 3,885,985 | 5/1975 | Serafin et al. | 106/822 |
| 4,126,475 | 11/1978 | Hansen et al. | 524/5 |
| 4,482,384 | 11/1984 | Miller | 106/665 |
| 4,828,619 | 5/1989 | Matsushita et al. | 106/661 |
| 4,978,392 | 12/1990 | Kilbarger et al. | 106/661 |
| 4,986,854 | 1/1991 | Okuno et al. | 106/810 |
| 5,294,256 | 3/1994 | Weigand et al. | 106/822 |

OTHER PUBLICATIONS

Product Literature relating to Krete EFC of Krete Industries, Inc., Butler, WI (Date unknown).

Product Literature relating to Acme–Shield of Acme–Hardesty Company, Inc., Jenkintown, PA (Date unknown).

*Primary Examiner*—Mark L. Bell
*Assistant Examiner*—Michael Marcheschi
*Attorney, Agent, or Firm*—Robert S. Honor; Carl W. Battle; Carol A. Loeschorn

[57] ABSTRACT

An anti-efflorescence admixture for concrete products comprising a tall oil fatty acid and a fatty acid, a portion of the acid content of the tall oil fatty acid and/or fatty acid optionally being present in salt form with an alkanolamine or alkylamine, which admixture is effective in controlling both primary and secondary efflorescence.

31 Claims, No Drawings

5,595,594

ANTI-EFFLORESCENCE ADMIXTURE FOR CONCRETE PRODUCTS

This is a division of application Ser. No. 08/330,276, filed Oct. 27, 1994 now abandoned.

BACKGROUND OF THE INVENTION

1. Field of the Invention

The present invention relates to concrete products and more particularly to an admixture formulated to control efflorescence in concrete products, particularly dry-cast concrete products.

2. Description of the Related Art

Efflorescence can be a significant problem in concrete products particularly dry-cast concrete products exposed to moisture in service. Efflorescence is the deposit of salts on the surface of concrete. The salts are leached out of the concrete with water and crystallize on subsequent evaporation of the water.

There are two types of efflorescence, primary (early, short-term) efflorescence and secondary efflorescence. Primary efflorescence is the result of salts which leach out from the cementitious mix upon evaporation of mix water. Secondary efflorescence is the result of salts which leach out of the concrete with water which moves through the concrete substrate, either continuously or intermittently, or with water which comes from exposure of the concrete surface to alternate wetting and drying.

There are admixtures available which are directed toward minimizing efflorescence, but most of these are only effective in controlling either primary or secondary efflorescence. There is still a need for a product which will minimize both primary and secondary efflorescence in concrete products, particularly dry-cast concrete products, without significantly compromising performance criteria, e.g. compressive and flexural strength.

SUMMARY OF THE INVENTION

In accordance with the present invention, it has been found that an admixture comprising: a) a tall oil fatty acid, and b) an unsaturated fatty acid having 8–28 carbon atoms in a weight ratio of tall oil fatty acid to unsaturated fatty acid of 1:10 to 2:1, preferably 1:5 to 2:1, and most preferably 1:2 to 1.5:1, is effective for minimizing both primary and secondary efflorescence in concrete products, particularly dry-cast concrete products.

The invention therefore provides, in one embodiment the above anti-efflorescence admixture. In a preferred embodiment, a portion of the acid content of said tall oil fatty acid and/or said fatty acid is in the salt form with at least one salt forming member selected from an alkanolamine or an alkylamine. In a further embodiment, the present invention provides a method of controlling efflorescence in concrete products comprising providing a concrete mix containing the anti-efflorescence admixture and causing said concrete mix to form a concrete product. In a still further embodiment, the present invention provides a concrete product formed from a cementitious mix comprising the anti-efflorescence admixture.

The anti-efflorescence admixtures of the present invention improve the quality of concrete products, particularly dry-cast concrete products, by controlling primary and secondary efflorescence, reducing water absorption, improving resistance to frost damage and increasing the color intensity of pigmented concrete. In addition, the admixtures are stable enough for bulk handling.

DETAILED DESCRIPTION OF THE INVENTION

The admixtures of the present invention can be used in any type of concrete application, e.g. ready-mix concrete, precast concrete, masonry, masonry mortar, stucco and pipe, however, the admixtures of the present invention are particularly useful for preparing dry-cast concrete products.

Dry-cast concrete products are well-known in the art and are formed from a relatively dry mix comprising cement and aggregate containing just enough water for cement hydration. Dry-cast concrete products include concrete block, concrete paving stones and concrete roof tiles.

Tall oil fatty acid is the fatty acid cut produced from the fractional distillation of crude tall oil. Tall oil fatty acid is commercially available and varies somewhat in its make-up depending upon the particular source, but generally contains about 84–94% fatty acids, 2–8% rosin acids and 2–8% unsaponifiables. The fatty acid portion generally contains about 45–55% oleic acid, 40–50% linoleic acids and 2–7% saturated fatty acids.

The unsaturated fatty acids useful in the present invention are unsaturated fatty acids having 8–28 carbon atoms. The unsaturated fatty acids may be branched or straight chain and unsubstituted or substituted with other functional groups, e.g. alcohol groups or amine groups, or any combination thereof. Preferably, the unsaturated fatty acid is an unsubstituted, straight chain $C_{12}$–$C_{20}$ fatty acid, e.g. oleic acid, palmitoleic acid, linoleic acid and mixtures thereof. Most preferably, the unsaturated fatty acid is oleic acid.

In a further preferred embodiment, a portion of the acid content of the tall oil fatty acid and/or the unsaturated fatty acid are optionally present in the admixture in salt form with at least one salt forming member selected from an alkanolamine or an alkylamine. The alkanolamines are selected from mono-, di- and trialkanolamines, e.g. ethanolamine, diethanolamine and triethanolamine. The alkylamines are selected from mono-, di- and trialkylamines and can be straight chain or branched provided they are capable of forming a salt with a fatty acid. Preferably, the alkylamine is a $C_{1-6}$ alkylamine, e.g. ethylamine, diethylamine, diisopropylamine and tributylamine. Preferably, a trialkanolamine such as triethanolamine, is used to form a salt with the tall oil fatty acid and/or unsaturated fatty acid. The admixtures containing an alkanolamine salt and/or an alkylamine salt have improved dispersing properties when mixed with cementitious materials and tend to enhance the compressive strength of concrete products relative to concrete products containing the admixture without an alkanolamine salt or an alkylamine salt.

The admixtures of the present invention are prepared by combining the tall oil fatty acid and the unsaturated fatty acid and mixing at room temperature until a homogeneous mix results, generally for a period of 20–30 minutes. Where it is desired to include an alkanolamine or alkylamine salt of the tall oil fatty acid and/or the fatty acid in the admixtures, the salts can be formed in situ or a preformed alkanolamine or alkylamine salt can be added directly to the admixture. The order of mixing of the components is not critical. Preferably the salt is formed in situ by combining the tall oil fatty acid and the fatty acid and mixing at room temperature until a homogeneous mix is obtained and then slowly adding in the desired alkanolamine or alkylamine to form the salt. Alternatively, all three materials can be combined and stirred until a homogeneous mix is obtained.

When it is desired to form the salt in situ, the alkanolamine and/or alkylamine is generally combined with the other components in an amount sufficient to form at least 2% by weight of salts, based on the total weight of the admixture. Generally, the alkanolamine and/or alkylamine is combined with the other components of the admixture in an amount sufficient to form between 2 and 50% by weight of salts, preferably between 4 and 15% by weight of salts, based on the total weight of the admixture. Alternatively, a preformed alkanolamine or alkylamine salt of a fatty acid or tall oil fatty acid can be combined with the tall oil fatty acid and unsaturated fatty acid to form the admixtures of the present invention containing a least 2% by weight of salt, based on the total weight of the admixture. Amounts of tall oil fatty acid and/or fatty acid salts in excess of about 15% by weight, based on the total weight of the admixture, tend to decrease the effectiveness of the admixture as an anti-efflorescence agent. This can be offset, at least in part, by increasing the dosage of the admixture for a particular application.

As mentioned above, the tall oil fatty acid and unsaturated fatty acid are present in the admixture in a weight ratio of tall oil fatty acid to unsaturated fatty acid of 1:10 to 2:1, preferably 1:5 to 2:1 and more preferably 1:2 to 1.5:1. If the tall oil fatty acid and/or unsaturated fatty acid are present in salt form, the ratio is calculated as if all the tall oil fatty acid and unsaturated fatty acid exists in the acid form.

The anti-efflorescence admixtures according-to the present invention are useful in minimizing efflorescence in dry-cast concrete products as described above. Dry-cast concrete products are well-known in the art and can be prepared by any art-recognized method with the admixture of the present invention being added into the concrete mix at any stage prior to hydration. Preferably, the admixture is added to the concrete mix during the pre-wet stage, i.e to the aggregate and a portion of the mix water, before the cement is added.

The type and amount of aggregate useful in the present invention is that normally used in concrete products and will depend on the particular application and the availability of materials.

The amount of admixture to be added to the concrete mix according to the present invention will vary depending upon the particular application. Generally, amounts of 3 to 12 fl. oz. of admixture per 100 lb. of cement (196 to 782 mL of admixture per 100 kg cement) are used to obtain effective efflorescence control.

The following examples are offered in order to further illustrate the present invention and are not intended to be limiting.

EXAMPLE 1

An admixture according to the present invention was prepared as follows: 17 lbs of CA 0406 Tall oil fatty acid, obtained from Chemical Associates of Ill., Inc., Copley, Ohio, and 17 lbs of oleic acid were combined and stirred for 30 minutes and transferred to a suitable storage vessel for later use (see Examples 4 and 5).

EXAMPLE 2

An admixture according to the present invention was prepared as follows: 16.2 lbs of CA 0406 tall oil fatty acid, 16.2 lbs of oleic acid and 1.7 lbs of triethanol amine were combined and stirred for 30 minutes and then transferred to a suitable storage vessel for later use (see Examples 3 and 4).

EXAMPLE 3

Concrete paving stones were prepared containing 3, 5 and 7 fl. oz. of the admixture of Example 2 per 100 lbs of cement (196, 326 and 456 mL/100 kg of cement). The procedures were as follows:

Into a turbine mixer, suitable for use in concrete paving stone production, was introduced 2,520 lbs (1,143 kg) of aggregate which was mixed with 10% of the mix water for approximately 30 seconds during which time the appropriate amount of the admixture of Example 2 was added. The aggregate was a blend of 250 lbs (113 kg) of #89 limestone and 2,270 lbs (1,029 kg) of manufactured sand. As the mixing action continued, approximately 480 lbs (218 kg) of Type I cement and the remainder of the mix water were introduced. After a total mixing time of 3 minutes, the mix was loaded by means of a conveyor belt into the feed hopper of a single-pallet paver machine. As the paving stones were produced, the pallets were rack-loaded then transported to a curing chamber where they remained for approximately 18 hours. After removal from the curing chamber, the paving stones were cubed, banded and placed in the yard as inventory.

Samples of the paving stones were randomly selected containing 3, 5 and 7 fluid ounces of the admixture of Example 2 per 100 lbs cement and tested to measure compressive strength, water absorption and efflorescence. The compressive strength and water absorption were measured in accordance with ASTM C140 and the results are reported in Table 1. Other samples of the paving stones were randomly selected at the end of the 18 hour curing period and were left to dry in a shaded area of the yard to slow dry over a four day period. No efflorescence (primary) development was observed during the four day period. However, reference paving stones, prepared in the same manner as above except there was no anti-efflorescence admixture added to the cementitious mix, exhibited a whitish "haze" indicative of primary efflorescence within 4 days. At 5 days of age, paving stones were randomly selected and subjected to a series of wetting and drying cycles. The paving stones were subjected to 3 hours of water sprayed from a lawn sprinkler followed by slow, shaded air drying. The wet/dry cycles continued for a period of 20 work days during which time the paving stones were also subjected to periodic rainfall. There was only slight evidence of efflorescence (secondary) at the bottom layers of paving stone. Considerably more efflorescence (secondary) was observed in the reference paving stones (which did not contain an anti-efflorescence admixture).

TABLE 1

| ADMIXTURE | DOSAGE (oz. per 100 lbs cement) | 7 DAY COMPRESSIVE STRENGTH | ABSORPTION (%) |
| --- | --- | --- | --- |
| Example 2 | 3 | 8,940 | 3.6 |
| Example 2 | 5 | 8,860 | 3.2 |
| Example 2 | 7 | 8,555 | 4.2 |

EXAMPLE 4

Architectural block was prepared, some containing 7 fl. oz of the admixture of Example 1 per 100 lbs cement, some containing 14 fl. oz. of the admixture of Example 1 per 100 lbs cement and some containing 7 fl. oz of the admixture of Example 2 per 100 lbs cement. The block was prepared by standard art procedures with a cement to aggregate ratio of 1:8 and with the admixture being added during the pre-wet stage to the aggregate and a portion of the mix water. After removal from the curing chamber, the architectural blocks were banded and placed in the yard as inventory.

Samples of the architectural block were randomly selected and tested as in Example 3. The compressive strength and absorption data appear in Table 2. The primary and secondary efflorescence were visually observed in a manner analogous to that in Example 3. There was no primary efflorescence observed within 4 days of curing for the blocks containing the anti-efflorescence admixtures of Example 1 and Example 2 whereas reference architectural block which did not contain an anti-efflorescence admixture exhibited signs of primary-efflorescence within 4 days of curing. Block containing the anti-efflorescence admixture of Example 1 and Block containing the anti-efflorescence admixture of Example 2 were subjected to repeated wet/dry cycles similar to those of Example 3 and only very slight if any secondary efflorescence was observed after 20 days. However, considerably more secondary efflorescence was observed within 20 days for reference block which did not contain any anti-efflorescence admixture.

TABLE 2

| ADMIXTURE | DOSAGE (oz. per 100 lbs cement) | 7 DAY COMPRESSIVE STRENGTH | ABSORPTION (%) |
| --- | --- | --- | --- |
| Example 1 | 7 | 3,000 | 3.1 |
| Example 1 | 14 | 2,980 | 4.2 |
| Example 2 | 7 | 3,780 | — |

EXAMPLE 5

Standard gray block was prepared, some containing 8 fl. oz. of the admixture of Example 1 per 100 lbs cement and some containing 12 fl. oz. of the admixture of Example 1 per 100 lbs cement. The block was prepared by standard art procedures with a cement to aggregate ratio of 1:11 and with the admixture being added during the pre-wet stage to the aggregate and a portion of the mix water. After removal from the curing chamber, the blocks were banded and placed in the yard as inventory.

Samples of the block were randomly selected and tested as in Example 3. The compressive strength and absorption data appear in Table 3. The primary and secondary efflorescence were visually observed in a manner analogous to that in Example 3. There was no primary efflorescence observed within 4 days of curing for the standard gray blocks containing the anti-efflorescence admixtures of Example 1 whereas reference standard gray block which did not contain an anti-efflorescence admixture exhibited signs of primary efflorescence within 4 days of curing. Standard gray block containing the anti-efflorescence admixture of Example 1 were subjected to repeated wet/dry cycles similar to those of Example 3 and only very slight secondary efflorescence was observed after 20 days. However, considerably more secondary efflorescence was observed within 20 days for reference standard gray block which did not contain any anti-efflorescence admixture.

TABLE 3

| ADMIXTURE | DOSAGE (oz. per 100 lbs cement) | 1-DAY COMPRESSIVE STRENGTH | 7-DAY COMPRESSIVE STRENGTH | ABSORPTION (%) |
| --- | --- | --- | --- | --- |
| Example 1 | 8 | 690 | 1,110 | 5.7 |
| Example 1 | 12 | 630 | 980 | 6.0 |

We claim:

1. An anti-efflorescence admixture for concrete products comprising:
   a) a tall oil fatty acid, and
   b) an unsaturated fatty acid having 8–28 carbon atoms, in a weight ratio of tall oil fatty acid to unsaturated fatty acid of 1:10 to 2:1; wherein 2 to 50% by weight of the acid of a) and b) being optionally in salt form with at least one salt-forming member selected from an alkanolamine or an alkylamine.

2. An anti-efflorescence admixture according to claim 1 wherein said salt-forming member is an alkanolamine.

3. An anti-efflorescence admixture according to claim 2 wherein said alkanolamine is trialkanolamine.

4. An anti-efflorescence admixture according to claim 3 wherein said trialkanolamine is triethanolamine.

5. An anti-efflorescence admixture according to claim 1 wherein the salt form of the acid is present in an amount of between 4 and 50% by weight, based on the total weight of the admixture.

6. An anti-efflorescence admixture according to claim 1 wherein said tall oil fatty acid and said unsaturated fatty acid are present in a weight ratio of 1:5 to 2:1.

7. An anti-efflorescence admixture according to claim 6 wherein said tall oil fatty acid and said unsaturated fatty acid are present in a weight ratio of 1:2 to 1.5:1.

8. An anti-efflorescence admixture according to claim 1 wherein said unsaturated fatty acid contains 12–20 carbon atoms.

9. An anti-efflorescence admixture according to claim 8 wherein said unsaturated fatty acid is oleic acid.

10. A method of inhibiting efflorescence in concrete products comprising adding to a concrete mix an admixture comprising:
    a) a tall oil fatty acid, and b) an unsaturated fatty acid having 8–28 carbon atoms, in a weight ratio of tall oil fatty acid to unsaturated fatty acid of 1:10 to 2:1; wherein 2 to 50% by weight of the acid of a) and b) being optionally in salt form with at least one salt-forming member selected from an alkanolamine or an alkylamine, and curing said concrete mix to form a concrete product.

11. A method according to claim 10 wherein said salt-forming member is an alkanolamine.

12. A method according to claim 11 wherein said alkanolamine is a trialkanolamine.

13. A method according to claim 12 wherein said trialkanolamine is triethanolamine.

14. A method according to claim 10 wherein the salt form of the acid is present in an amount of between 4 and 50% by weight, based on the total weight of the admixture.

15. A method according to claim 10 wherein said tall oil fatty acid and said unsaturated fatty acid are present in a weight ratio of 1:5 to 2:1.

16. A method according to claim 15 wherein said tall oil fatty acid and said unsaturated fatty acid are present in a weight ratio of 1:2 to 1.5:1.

17. A method according to claim 10 wherein said unsaturated fatty acid contains 12–20 carbon atoms.

18. A method according to claim 17 wherein said unsaturated fatty acid is oleic acid.

19. A concrete product which is formed from a cementitious composition containing an admixture comprising: a) a tall oil fatty acid, and b) an unsaturated fatty acid having 8–28 carbon atoms in a weight ratio of tall oil fatty acid to unsaturated fatty acid of 1:10 to 2:1; wherein 2 to 50% by weight of the acid of a) and b) being optionally in salt form with at least one salt-forming member selected from an alkanolamine and an alkylamine.

20. A concrete product according to claim 19 wherein said concrete product is a dry-cast concrete product.

21. A concrete product according to claim 19 wherein said salt-forming member is an alkanolamine.

22. A concrete product according to claim 21 wherein said alkanolamine is trialkanolamine.

23. A concrete product according to claim 22 wherein said trialkanolamine is triethanolamine.

24. A concrete product according to claim 19 wherein the salt form of the acid is present in an amount between 4 and 50% by weight, based on the total weight of the admixture.

25. A concrete product according to claim 19 wherein said tall oil fatty acid and said unsaturated fatty acid are present in a weight ratio of 1:5 to 2:1.

26. A concrete product according to claim 25 wherein said tall oil fatty acid and said unsaturated fatty acid are present in a weight ratio of 1:2 to 1.5:1.

27. A concrete product according to claim 19 wherein said unsaturated fatty acid has 12 to 20 carbon atoms.

28. A concrete product according to claim 27 wherein said unsaturated fatty acid is oleic acid.

29. An anti-efflorescence admixture for concrete products comprising:
   a) a tall oil fatty acid, and
   b) an unsaturated fatty acid having 8–28 carbon atoms, in a weight ratio of tall oil fatty acid to unsaturated fatty acid of 1:10 to 2:1; wherein 2 to 50% by weight of the acid of a) or b) being optionally in salt form with at least one salt-forming member selected from an alkanolamine or an alkylamine.

30. A method of inhibiting efflorescence in concrete products comprising adding to a concrete mix an admixture comprising: a) a tall oil fatty acid, and b) an unsaturated fatty acid having 10–28 carbon atoms, in a weight ratio of tall oil fatty acid to unsaturated fatty acid of 1:10 to 2:1; wherein 2 to 50% by weight of the acid of a) or b) being optionally in salt form with at least one salt-forming member selected from an alkanolamine or an alkylamine, and curing said concrete mix to form a concrete product.

31. A concrete product which is formed from a cementitious composition containing an admixture comprising: a) a tall oil fatty acid, and b) an unsaturated fatty acid having 8–28 carbon atoms in a weight ratio of tall oil fatty acid to unsaturated fatty acid of 1:10 to 2:1; wherein 2 to 50% by weight of the acid of a) or b) being optionally in salt form with at least one salt-forming member selected from an alkanolamine or an alkylamine.

\* \* \* \* \*